(12) United States Patent
Wölfing

(10) Patent No.: US 12,488,441 B2
(45) Date of Patent: Dec. 2, 2025

(54) ITERATIVE RECONSTRUCTION OF AN INPUT IMAGE

(71) Applicant: SCHOTT AG, Mainz (DE)

(72) Inventor: Bernd Wölfing, Mainz (DE)

(73) Assignee: SCHOTT AG, Mainz (DE)

( * ) Notice: Subject to any disclaimer, the term of this patent is extended or adjusted under 35 U.S.C. 154(b) by 163 days.

(21) Appl. No.: 18/475,561

(22) Filed: Sep. 27, 2023

(65) Prior Publication Data

US 2024/0104704 A1    Mar. 28, 2024

(30) Foreign Application Priority Data

Sep. 27, 2022   (DE) ...................... 10 2022 124 744.9

(51) Int. Cl.
   *G06T 5/77*    (2024.01)
   *G06T 5/70*    (2024.01)
   *H04N 23/80*   (2023.01)

(52) U.S. Cl.
   CPC .................. *G06T 5/77* (2024.01); *G06T 5/70* (2024.01); *H04N 23/80* (2023.01); *G06T 2207/10024* (2013.01); *G06T 2207/20216* (2013.01); *G06T 2207/20221* (2013.01)

(58) Field of Classification Search
   None
   See application file for complete search history.

(56) References Cited

U.S. PATENT DOCUMENTS

| 6,524,237 | B1 | 2/2003 | McGowan |
| 2014/0276111 | A1 | 9/2014 | Gal |
| 2021/0386277 | A1 | 12/2021 | Gordon |

FOREIGN PATENT DOCUMENTS

DE      10115826 A1 * 10/2002    ............. G01B 11/00

OTHER PUBLICATIONS

English translation of DE-10115826-A1, Fensterle, 2002 (Year: 2002).*
Van Siclen, "Iterative method for solution of radiation emission/transmission matrix equations", Idaho National Laboratory, Idaho Falls, Idaho 83415, USA, Jan. 4, 2011, 2 pages.

* cited by examiner

Primary Examiner — James M Hannett
(74) Attorney, Agent, or Firm — Ruggiero McAllister & McMahon LLC

(57) ABSTRACT

A method for iteratively reconstructing an input image from an acquired output image generated by transmitting components of the input image by a light guide having unsorted fibers where the output image is detected by an image sensor having a plurality of sensor points includes the steps of: calculating an input image area brightness value for a first area of the input image based on at least a first sensor point brightness value, a first weighting factor, and at least one further input image area brightness; and replacing a first input image area brightness value with the calculated input image area brightness value for subsequent use as the first input image area brightness value. The calculating and replacing are sequentially performed.

24 Claims, 8 Drawing Sheets

Fig. 6B

ITERATIVE RECONSTRUCTION OF AN INPUT IMAGE

CROSS-REFERENCE TO RELATED APPLICATIONS

This application claims priority under 35 U.S.C. § 119 to German patent application DE 10 2022 124 744.9, filed Sep. 27, 2022, the entire disclosure of which is incorporated herein by reference.

BACKGROUND OF THE DISCLOSURE

1. Field of the Disclosure

The application relates to a method for iteratively reconstructing an input image from a detected output image, wherein the output image is generated at least in part by transmitting components of the input image with a light guide comprising at least in part unsorted fibers. The application further relates to a computer program product, a device and a use.

2. Description of Related Art

Light guides in the form of fiber bundles are known for transmitting light. In this context, a light guide typically comprises a plurality of fibers which extend between an input-side end and an output-side end of the light guide and which are each designed to guide light, which is coupled into a fiber at one of the ends of the light guide, substantially along an extension direction of the respective fiber. For this purpose, each of the fibers comprises light-transmissive material, for example glass fiber. The light is typically guided by internal reflection of the light in the fiber at an optical interface in the area of the fiber's cladding surface. This enables light to be guided along the extension direction of the respective fiber, even in the case of obliquely incoupled light and even if the fiber is curved. An arrangement of the fibers relative to each other over the path of the light guide is typically not controlled in the course of the manufacturing process. Light entering the ends of the fibers in a certain area within the end face of the light guide therefore typically loses its local correlation when passing through the light guide due to the unsorted path of the fibers and thus exits at disorderly distributed, i.e. locally different, locations within the output-side end face of the light guide with respect to the input side. In other words, the light-transporting fibers in a prior art fiber-optical light guide are essentially, in particular with exceptions, arranged locally undefined between the input and output sides. Therefore, an optical transmission of images is in particular not possible by use of prior art light guides.

However, image guides are known for the optical transmission of images. These are essentially based on the same functionality as light guides. Unlike light guides, however, image guides have a sorted arrangement of light-transporting fibers. A local correlation between different areas of an input image, which are coupled into different fibers of the image guide on the input side, is thus maintained even when the light leaves the image guide. In other words, the light-transporting fibers in a prior art fiber-optic image guide are arranged in essentially identical locations between the input and output sides in terms of their neighborhood relations.

Image guides thus allow optical transmission of an image. This allows, for example, the acquisition of image information and its optical transmission at locations where a direct sensory acquisition of the image, e.g. with a camera, is not possible or only possible with difficulty. Typical applications are medical probes or optical monitoring under conditions that offer only insufficient space for a camera or are otherwise unfavorable.

Compared to light guides, however, image guides require considerably more production effort and thus considerably higher production costs. In addition, many applications do not require a high degree of optical quality, e.g. high resolution or a high degree of detail, sharpness and/or contrast of a transmitted image, as is achievable with image guides.

It is therefore desirable to provide a technique that mitigates or avoids the aforementioned disadvantages.

SUMMARY OF THE DISCLOSURE

According to a first aspect, a method for iteratively reconstructing an input image from a detected output image, wherein the output image is generated at least in part by transmitting components of the input image with a light guide comprising at least in part unsorted fibers by means of an image sensor which comprises a plurality of sensor points, comprises calculating an input image area brightness value for a first area of the input image based at least in part on at least a first sensor point brightness value associated with a first sensor point of the image sensor and indicative of a sensed brightness of the output image in the area of the first sensor point, a first weighting factor associated with the first area of the input image with respect to the first sensor point, and at least one further input image area brightness value associated with a further area of the input image and weighted by a further weighting factor associated with the further area of the input image with respect to the first sensor point. The method further comprises replacing a first input image area brightness value associated with the first area of the input image with the calculated input image area brightness value for use as a henceforth first input image area brightness value. The aforementioned method steps of calculating and replacing are applied sequentially, in particular iteratively.

The sequential application of the method steps of calculating and replacing can comprise a sequential application of the method steps of calculating and replacing to each of a plurality of sensor point brightness values assigned to different sensor points of the image sensor, and/or to each of a plurality of areas of the input image, and/or to each of one or more weighting factors, each associated with any area of the input image with respect to a same sensor point of the image sensor, or can be in the form of repeatedly performing first calculating (210) for each of a plurality of areas (EG-1-EG-q) of the input image (E) and then replacing (220) the input image area brightness values ($H_1$-$H_q$) associated with the plurality of areas (EG-1-EG-q) of the input image (E) with the calculated input image area brightness values ($H_1'$-$H_q'$).

The fibers can be at least partially unsorted such that light entering ends of the fibers located in a predetermined region within an end face of the light guide loses its local correlation as it passes through the light guide. A proportion of the fibers of the light guide that are unsorted in such a manner can be more than 10%, in particular more than 90%.

According to a first embodiment, the sequential application can comprise sequentially applying the method steps of calculating and replacing to each sensor point brightness value associated with any sensor point of the plurality of sensor points of the image sensor, and/or to each of one or more weighting factors each associated with any area of the input image with respect to a respective sensor point of the image sensor.

According to a further embodiment, calculating the input image area brightness value, i.e., prior to a replacement, can be based on a plurality of sensor point brightness values which are associated with different sensor points of the image sensor and which respectively are indicative of a sensed brightness of the output image in the area of the respective sensor point. In this regard, the calculating, i.e., prior to a replacing, can be performed for each of one or more weighting factors respectively associated with any area of the input image with respect to a respective sensor point of the image sensor.

In the further embodiment, the calculating can further be performed for each of the plurality of sensor point brightness values based at least in part on a respective first weighting factor associated with the first area of the input image with respect to the respective sensor point and at least one respective further input image area brightness value which is associated with a respective further area of the input image and is weighted by a respective further weighting factor associated with the respective further area of the input image with respect to the respective sensor point.

In the further embodiment, the calculating can further be performed for each of the plurality of sensor point brightness values, respectively for determining a sensor point specific brightness value for the first area of the input image. The calculation of the input image area brightness value can be performed based on the plurality of sensor point specific brightness values for the first area (EG-i) of the input image (E). Calculating the input image area brightness value based on the plurality of sensor point specific brightness values for the first area can further comprise averaging the plurality of sensor point specific brightness values for the first area. The averaging can be performed according to a weighting of the plurality of sensor point specific brightness values for the first area based on the weighting factors associated with the first area with respect to the respective sensor points.

In the further embodiment, the sequential applying can be performed for each of a plurality of areas of the input image. Alternatively, in the further embodiment, the sequential applying can take the form of repeatedly performing first calculating (210) for each of a plurality of areas (EG-1-EG-q) of the input image (E) and then replacing (220) the input image area brightness values ($H_1$-$H_q$) associated with the plurality of areas (EG-1-EG-q) of the input image (E) with the calculated input image area brightness values ($H_1'$-$H_q'$).

The method can comprise repeatedly performing the sequential applying, in particular until a predetermined termination criterion occurs. Alternatively, if the sequential applying is in the form of repeatedly performing first calculating for each of a plurality of areas of the input image and then replacing the input image area brightness values associated with the plurality of areas of the input image with the calculated input image area brightness values, the sequential applying can be performed until a predetermined termination criterion occurs. The termination criterion can comprise a number of executions of the method for the same area(s) of the input image and/or a falling below a threshold difference between successive calculations of an input image area brightness value for the same area(s) of the input image. The threshold difference can be 0.1 times or less, preferably 0.05 times or less, more preferably 0.03 times a brightness of the respective input image area. A low threshold difference thereby favors a reliable reconstruction result for the input image. A high threshold difference favors a fast process termination because of the earlier reaching of the threshold difference.

Additionally, or alternatively, the method can further comprise, prior to calculating, determining, for each of the plurality of sensor points, a set of weighting factors each associated with a different area of the input image with respect to the respective sensor point.

Determining the set of weighting factors can be based, at least in part, on a proportionality with which a brightness in the area of the input image associated with a respective weighting factor with respect to the respective sensor point contributes to a sensed brightness of the output image in the area of the sensor point.

In this case, the proportionality can be at least partially due to a fiber arrangement of the light guide.

Determining the set of weighting factors can further comprise: determining, for each of a plurality of areas of the input image, a proportionality with which a brightness in the respective area of the input image contributes to a sensed brightness of the output image in the area of the sensor point, discarding areas of the input image for which the proportionality contributes less than a threshold proportionality, and determining a weighting factor for each of the remaining areas based at least in part on the proportionality associated with the respective area. The threshold proportionality can be 0.5 or less, preferably 0.2 or less, more preferably 0.1 or less. Additionally, or alternatively, the threshold-value proportionality can be 0.005 or more, preferably 0.008 or more, more preferably 0.01 or more. The threshold proportionality can be in the range between 0.005 and 0.5, preferably between 0.008 and 0.2, more preferably between 0.01 and 0.1. A low threshold value proportionality has the effect that even input image areas contributing relatively weakly to the detected brightness are taken into account, so that a more accurate reconstruction of the input image is favored. A high threshold proportionality has the effect that relatively many input image areas can be excluded from the calculation, so that a high efficiency of the method is favored with relatively low information loss. The method can also include a normalization of the weighting factors.

The calculation can further be performed at least in part according to a mathematical function relating the first sensor point brightness value to a sum of the input image area brightness values weighted by their respective weighting factors.

The method can further comprise, prior to a first calculation of an input image area brightness value, assigning a brightness start value to each area of the input image as the input image area brightness value of the respective area. In this case, the brightness start value for each area can be predetermined, in particular independently of the input image. Alternatively, the brightness start value for each area can be determined based on at least one characteristic, in particular an average brightness of the input image, detected by the image sensor. Further, alternatively, the brightness start value for each area can be determined based on a previous reconstructed input image, in particular a respective input image area brightness value of each area of a previous reconstructed input image. This is particularly suitable when applying the method to a series of images.

The computing can further comprise an attenuation based on one or more previously computed input image area brightness values of the first area of the input image. The attenuation can promote a convergence behavior and/or a stability of the process between iterative executions of the process. In this regard, a ratio determined based on the weighting factors between a detected brightness in the area of the sensor point used for the calculation or between detected brightnesses in the areas of the sensor points used for the calculation and a brightness of the first area of the input image determined therefrom can be averaged with the one or more previously calculated input image area brightness values of the first area. In this case, the averaging can be done according to an attenuation weighting of the one or more previously calculated input image area brightness values of the first area and the determined brightness of the first area. The attenuation weighting can be constant for the first area during successive executions of the process. Alternatively, the attenuation weighting can vary during successive executions of the process for the first area.

Additionally or alternatively, the computing can include local smoothing based on one or more input image area brightness values associated with adjacent areas of the first area in the input image. The smoothing can promote an adaptation of the brightness values of adjacent input image areas corresponding to a contiguous image object in the input image. In this regard, a ratio determined based on the weighting factors between a detected brightness in the area of the sensor point used for the calculation or between detected brightnesses in the areas of the sensor points used for the calculation and a brightness of the first area of the input image determined therefrom can be averaged with the one or more input image area brightness values associated with adjacent areas of the first area in the input image. The averaging can be performed according to a smoothing weighting of the one or more input image area brightness values associated with adjacent areas of the first area in the input image and the determined brightness of the first area.

The averaging in performing the attenuation and/or the smoothing can include determining an arithmetic mean value, a geometric mean value, and/or an otherwise defined intermediate value of the values used for averaging.

The plurality of sensor points can be disposed in a sensor area of the image sensor. In this regard, the plurality of sensor points can be determined by a total number of sensor points of the image sensor. Alternatively, the plurality of sensor points can be determined by a subset of sensor points of the image sensor by which the output image is detected.

The image sensor can have a plurality of color channels. In this case, the method, in particular the sequential application of the method steps of calculating and replacing, can be performed separately for each of the plurality of color channels. The determination of the sets of weighting factors can be performed uniformly for the plurality of color channels. Alternatively, determining the sets of weighting factors can be performed separately for each of the plurality of color channels.

In order to form the plurality of color channels, each sensor point of the plurality of sensor points can comprise means for detecting a brightness according to different light wavelength ranges. In one embodiment, each sensor point, in particular in the form of a sensor pixel, comprises a plurality of sensor sub-points, in particular in the form of sensor micropixels. Each of the sensor sub-points of a sensor point is thereby designed to detect a brightness according to one of the different light wavelength ranges. In this case, the determination of the sets of weighting factors can be performed uniformly for the plurality of sensor sub-points of a sensor point.

In an alternative embodiment, each sensor point is designed to detect a brightness according to one of the different light wavelength ranges. Sensor points which are different with respect to their light wavelength range can be arranged distributed in a sensor area of the image sensor, in particular alternately according to staggered grids. The determination of the sets of weighting factors can be implemented separately for each of the sensor points. Additionally or alternatively, the plurality of sensor points can further be determined by an identical color channel to which all corresponding sensor points are assigned when performing the method, in particular the sequential application of the method steps of calculating and replacing.

The method can further comprise merging the input image area brightness values determined for each of the plurality of color channels, in particular for reconstructing a multi-color input image.

The plurality of color channels can include at least a red, a green and a blue color channel. Alternatively, the plurality of color channels can comprise at least one cyan, one magenta, and one yellow color channel. Additionally or alternatively, the plurality of color channels can comprise at least one color channel in the infrared light wavelength range and/or at least one color channel in the ultraviolet light wavelength range.

The optical fiber and the image sensor can be configured such that a number of the fiber points in the light guide and a number of the sensor points of the image sensor, by which the output image is detected, are different from each other by not more than twenty times, preferably by not more than ten times, more preferably by not more than three times, the respective smaller of the two numbers.

The input image can correspond to an optical projection of at least a region of an environment coupled into the optical fiber.

The method can further comprises storing and/or outputting the input image area brightness values in a data format suitable for storing and/or displaying a reconstruction of the input image.

According to another aspect, a computer program product is disclosed. The computer program product comprises part of program code which, when executed on a programmable computing device, cause the computing device to execute the method of the type disclosed herein.

According to a further aspect, a device is disclosed. The device comprises at least one light guide comprising at least partially unsorted fibers, and at least one image sensor comprising a plurality of sensor points and adapted to detect an output image generated at least in part by transmitting components of an input image via the light guide.

The device can further comprise a processing device comprising a processor unit and a memory device operatively connected to the processor unit, wherein the processor unit is configured to execute a method of the type disclosed herein.

The light guide and the image sensor can be configured such that a number of the fibers in the light guide and a number of the sensor points of the image sensor by which the output image is detected differ from each other by not more than twenty times, preferably not more than ten times, more preferably not more than three times, the respective smaller of the two numbers.

According to a further aspect, a use of a method, a computer program product and/or a device of the type respectively disclosed herein are disclosed. The use is for reconstructing a plurality of input images in real time, wherein the input images are coupled into the light guide in conjunction with real time image acquisition.

The use can be for the purpose of monitoring a movement and/or a number of moving objects represented by the plurality of input images.

BRIEF DESCRIPTION OF THE DRAWINGS

Further features, advantages and objects of the disclosure will become apparent from the drawings and the detailed description.

FIGS. 6A and 6B show complementary portions of an example of an iterative re-construction of an input image.

DETAILED DESCRIPTION OF THE DISCLOSURE

Figure 1A:
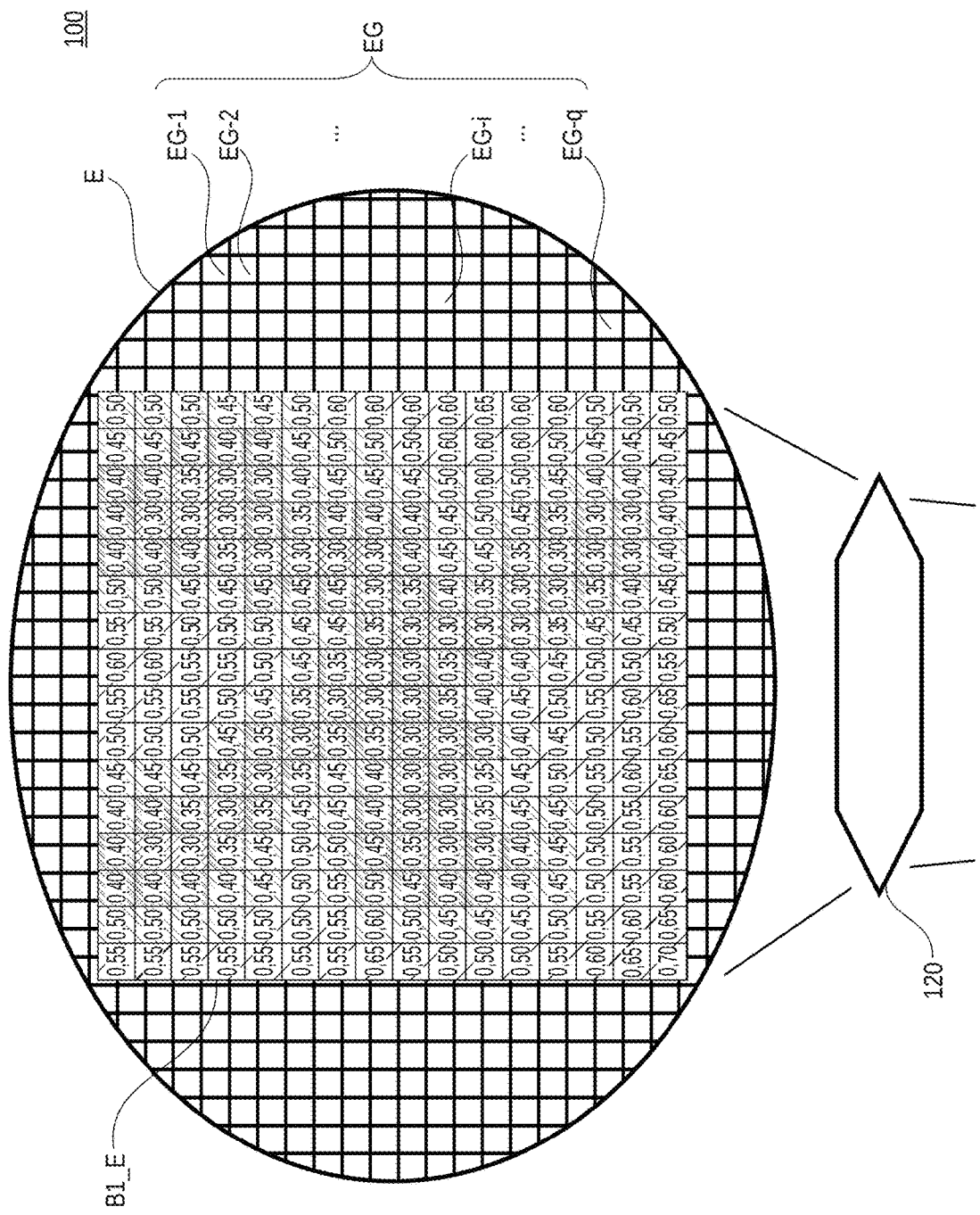
FIGS. 1A to 1D show complementary sections of a device for iteratively reconstructing an input image according to an example.
Figure 1B:
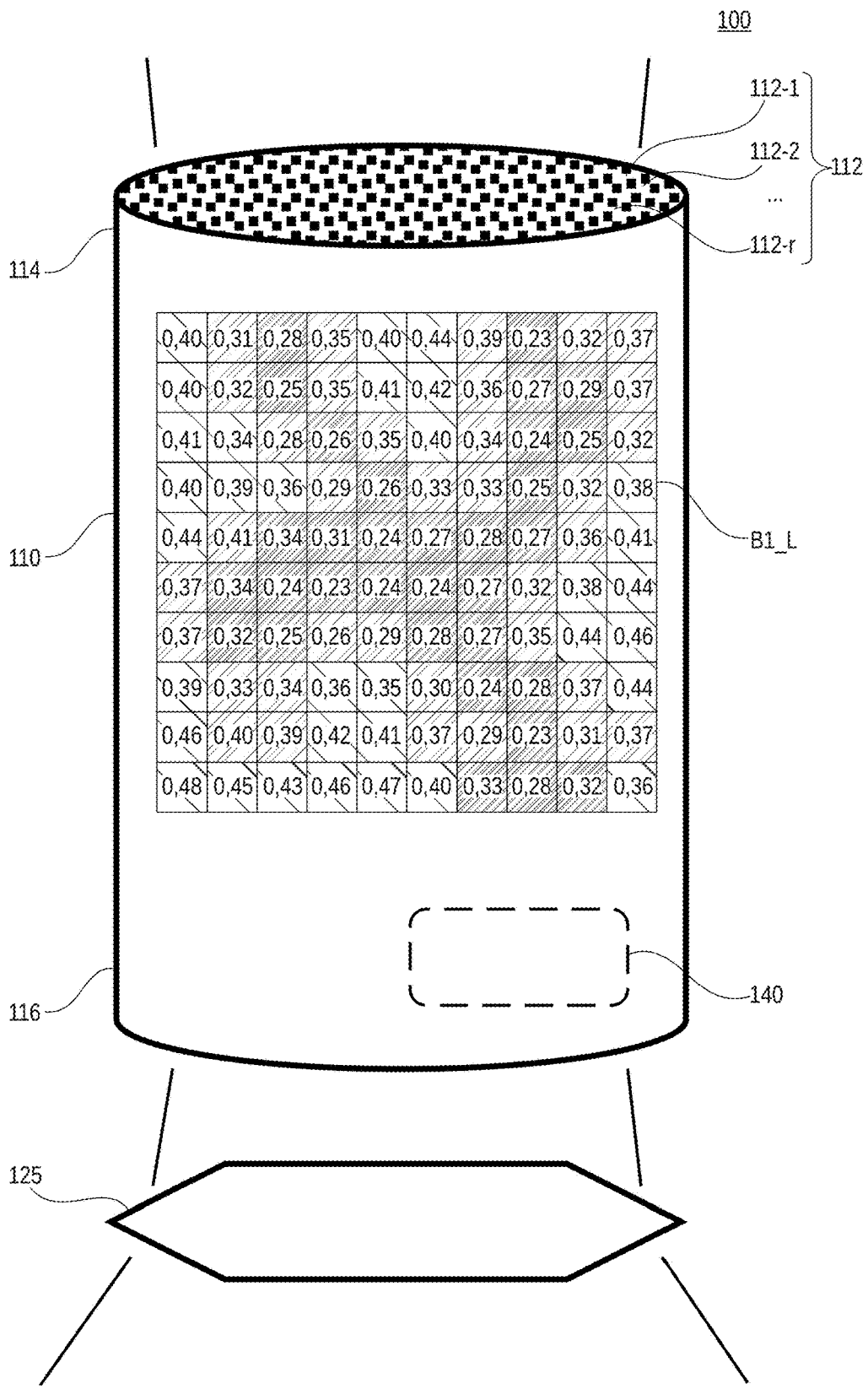
Figure 1C:
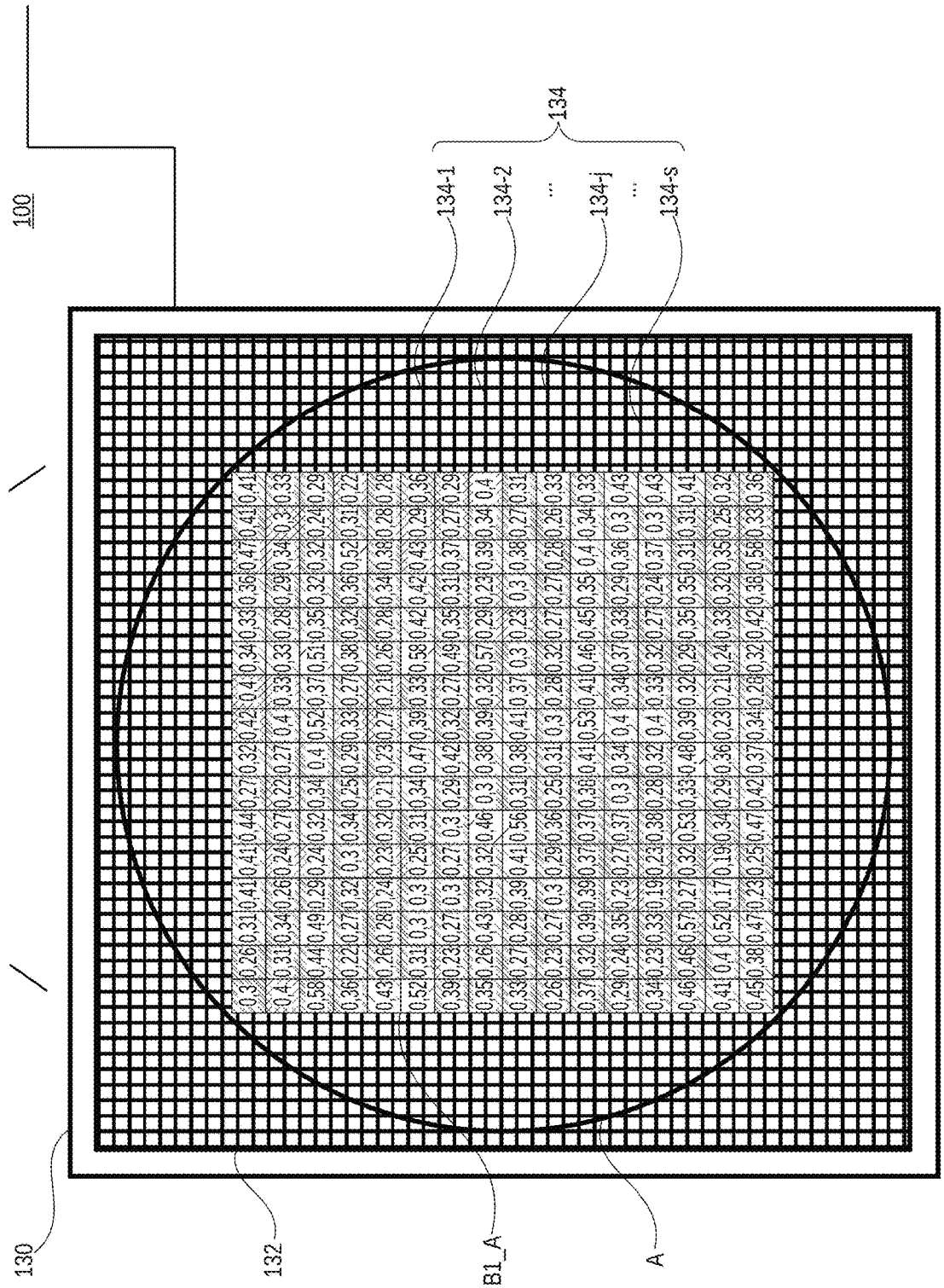

FIGS. 1A to 1D together schematically illustrate an example of a device 100 for iteratively reconstructing an input image. In this regard, FIGS. 1A to 1D each show one of a plurality of complementary portions of the device 100. The device 100 comprises a light guide 110, as shown in FIG. 1B, and an image sensor 130, as shown in FIG. 1C. The light guide 110 includes a plurality of fibers 112 which extend between an input-side end 114 and an output-side end 116 of the light guide 110 and are each adapted to guide light coupled into a fiber 112 at one of the ends 114, 116 of the light guide 110 substantially along an extension direction of the respective fiber 112. To this end, each of the fibers 112 comprises light-transmissive material, such as an optical fiber. The light conduction typically takes place by internal reflection of the light in the fiber 112 at an optical interface in the region of the cladding surface of the fiber 112. This enables light conduction along the extension direction of the respective fiber 112 even in the case of obliquely incoupled light and/or a curved path of the fiber 112. In addition, each individual one of the fibers 112-1-112-r functions essentially as an independent medium for light conduction independent of light conduction in the remaining fibers 112-1-112-r.

The fibers 112 are at least partially unsorted in the light guide 110. That is, due to the manufacturing process an arrangement of individual fibers 112-1-112-r relative to each other in the region of the input-side end 114 of the light guide 110 does not, or at most randomly, coincide with an arrangement of the respective fibers 112-1-112-r relative to each other in the region of the output-side end 116 of the light guide 110.

As schematically shown in FIG. 1B, the input-side end 114 of the light guide 110 has an arrangement of the fibers 112 substantially in accordance with a bundle of the fibers 112. In this regard, an end face of the input-side end 114 of the light guide 110 at which light is effectively coupled in substantially corresponds to a side-by-side arrangement of respective cross-sectional areas of the fibers 112-1-112-r. As a result of the at least partially unsorted arrangement of the fibers 112 in the light guide 110, light that impinges at the input-side end 114 onto a contiguous partial area of the end face corresponding to a subset of adjacent fibers 112 typically emerges at the output-side end 116 of the light guide 110 in a discontinuous and disorderly distributed manner over multiple locations of the end face of the output-side end 116. This follows from the fact that each of the fibers forming the adjacent subgroup at the input side can emerge at a different arbitrary location at the end face of the output-side end 116 of the light guide 110. Information about a local correlation of light coupled into different fibers 112 via the end face of the input-side end 114 of the light guide 114 is thereby lost during the transport of the light through the light guide 110 until the light exits the output-side end 116.

In FIG. 1B, the light guide 110 is shown simplified as a straight cylinder. In typical examples, the light guide 110 is formed to be flexible, and furthermore, a length of the light guide 110 is several orders of magnitude greater than a diameter of the light guide 110.

The image sensor 130 is arranged at the output side of the light guide 110. This corresponds to an arrangement of the image sensor 130 shown in FIG. 1C in extension of the representation of FIG. 1B at the lower edge of the image. In this case, the image sensor 130 is also arranged in such a way that light emerging from the output-side end 116 of the light guide 110 impinges on a sensor surface 132 of the image sensor 130. This is shown schematically in FIGS. 1B and 1C by the diagonal line pairs at the lower image edge of FIG. 1B and at the upper image edge of FIG. 1C. The light incident on the sensor surface 132 is detected there by a plurality of sensor points 134 of the image sensor 130. The image sensor 130 is, for example, a CCD sensor.

In the example shown, the device 100 further comprises an output optics 125. The output optics 125 is arranged such that light emerging from the output end 116 of the light guide 110 is projected onto an area of the sensor surface 132 of a suitably selected size.

The input-side end 114 of the light guide 110 is directed toward an input image E, as shown in FIG. 1A. The representation in FIG. 1A corresponds to an extension of the representation of FIG. 1B at the upper edge of the image. The input image E corresponds, for example, to the optical image of an environment to be monitored. The input image E is coupled into the light guide 110 via the input-side end 114. In the example shown, the device 110 further comprises an input optics 120 for this purpose. The input optics 120 is configured to optically project the input image E onto the end face of the input-side end 114 of the light guide 110. This is shown schematically in FIGS. 1A and 1B by the diagonal line pairs at the bottom edge of FIG. 1A and at the upper edge of FIG. 1B.

The input image E coupled into the light guide 110 is transported by the fibers 112 of the light guide 110. In this process, different fibers 112-1-112-r respectively transport light associated with different local components of the input image E in accordance with an extension of the projected input image E over the input-side end 114 of the light guide and an arrangement of the individual fibers 112-1-112-r at the input-side end 114. The light emerging from all of the fibers 112 at the output-side end 114 of the light guide forms the output image A. In the output image A, as described above, the local correlation of different components of the input image E is lost due to the at least partially unsorted arrangement of the fibers 112 over the path of the light guide 110.

As shown in FIG. 1C, the sensor surface 132 is dimensioned such that, optionally in conjunction with the output optics 125, the output image A is completely detected. To this end, the sensor surface 132 is dimensioned, for example, such that exiting light from all fibers 112 of the light guide 110 is detected. Different from the example shown, other examples of the device 100 do not include an output optics 125. In some examples, the output-side end 116 of the light guide 110 is arranged in optical contact with the sensor surface 132 in such a way that a light distribution present at the output-side end 116 of the light guide 110 is directly detected by the image sensor 130.

Preferably, there is no unambiguous assignment of each of the fibers 112 to a particular sensor point 134. In such a case, a reconstruction of the input image would instead advantageously be performed by a local interchange of the sensor point data corresponding to an inversion of the local interchange due to the unsorted fibers of the light guide.

As shown schematically in FIG. 1B, the light guide 110 typically has a substantially circular cross-section including substantially circular end faces at the input-side end 114 and the output-side end 116. Such a shape is typically the least elaborate in manufacturing an optical fiber. In other examples, at least one of the end faces of the light guide 110 at the input-side end 114 and/or the output-side end 116 can have a shape differing therefrom, such as a rectangular or hexagonal shape. In this case, the output-side end face is shaped, for example, such that the image sensor 130 entirely senses the end face of the output-side end 116 while simultaneously utilizing as large a proportion as possible of sensor points of the sensor surface 132. For a circular fiber bundle and a square sensor area, only about 78.5% of the sensor points can be used due to geometric constraints. For a circular fiber bundle and a rectangular sensor surface with an aspect ratio of 3:2, even only about 52.4% of the sensor points are usable. In contrast, by adjusting the shape of the end face(s), the percentage of usable sensor points can be increased to over 90%.

Figure 1D:
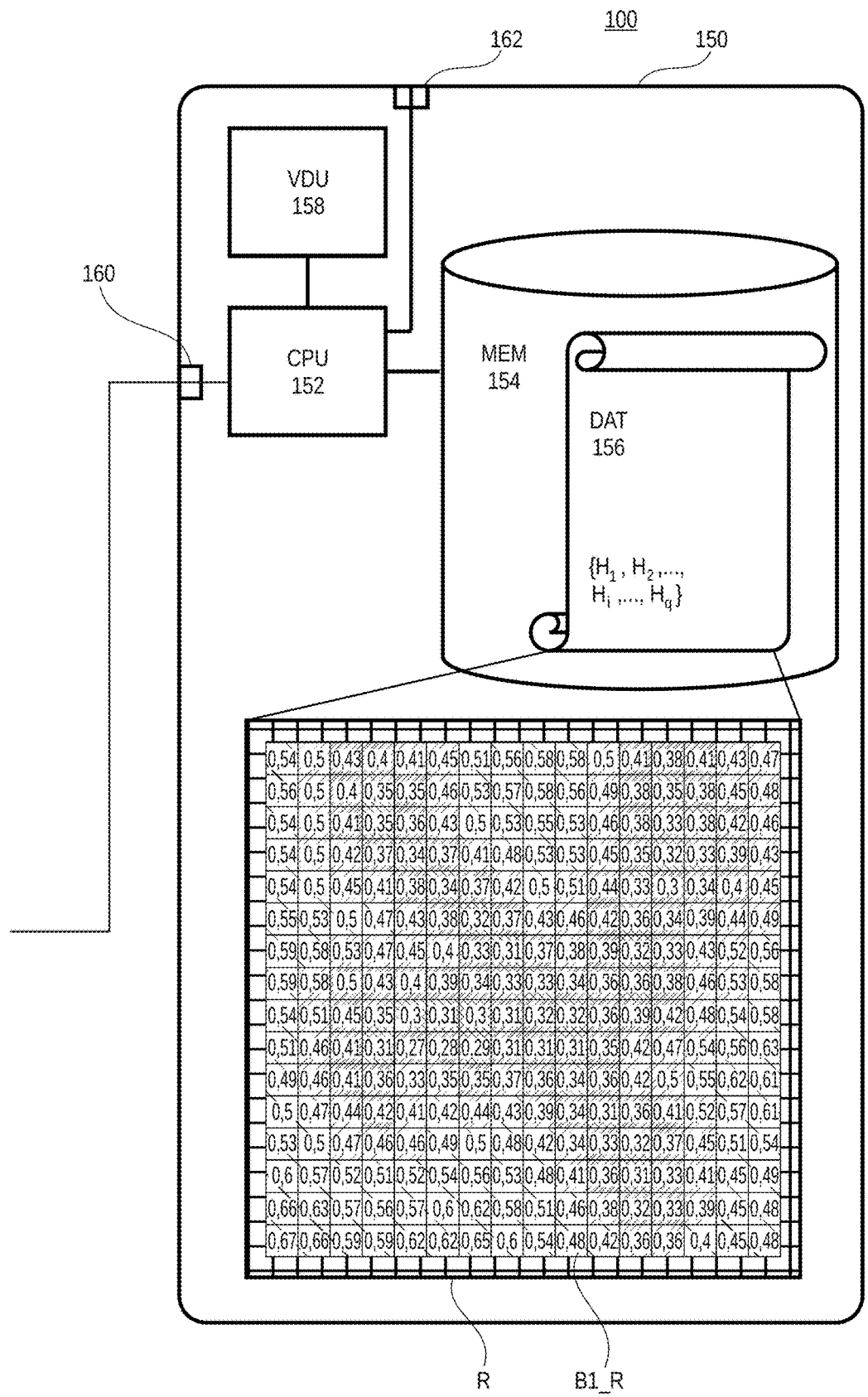

In the example shown, the device 100 further comprises a processing device 150, as shown in FIG. 1D. The representation in FIG. 1D corresponds to an extension of the representation of FIG. 1C at the right edge of the image. The processing device 150 includes a programmable processor unit 152 and a memory device 154 operatively connected to the processor unit 152. The processing device 150 further comprises an input interface 160.

The image sensor 130 is communicatively connected to the processing device 150 via the input interface 160 of the processing device 150. In this regard, the image sensor 130 is adapted to output corresponding sensor information to the processing device 150 for processing by the central processing unit (CPU) 152 when the output image A is detected. This is shown schematically in FIGS. 1C and 1D by the outgoing line at the right edge of FIG. 1C and the incoming line at the left edge of FIG. 1D.

The processing unit 152 is configured to iteratively reconstruct the input image E based on the received sensor information of the image sensor 130 with respect to the output image A, as described in detail below. In this regard, the processing device 150 is further configured to store and/or output the reconstruction image R as a data object 156 in a data format that allows the reconstruction image R to be imaged and/or stored.

In the example shown, the processing device 150 is adapted to store the data object 156 by use of the storage device 154. Furthermore, in the example shown, the processing device 150 comprises a display unit 158 (video display unit, VDU) and an output interface 162. The processing device 150 is designed to output the reconstruction image R graphically by the display unit 158 and/or to output the reconstruction image R in the form of the data object 156 or in the form of any other data format suitable for outputting and/or storing the reconstruction image R by the output interface 162 to a further output and/or processing device.

In the example of FIG. 1B, the fibers 112 in the light guide 110 comprise a number r. In addition, the sensor points 134 of the image sensor 130, by which the output image A is captured, comprise a number s. In FIG. 1A, the input image E is further divided into a plurality of input image areas EG, the meaning of which will become clear from the following description.

In FIG. 1A, an example input image B1_E is shown in the area of the input image E. Here, the motif of the example input image B1_E is chosen arbitrarily. To illustrate the presented method, the example input image B1_E consists of a square grid of (here simplified assumed) 16 by 16 input image areas EG. Each input image area is assigned a brightness value between 0, corresponding to minimum brightness, and 1, corresponding to maximum brightness. The respective brightness is additionally indicated by a corresponding hatching of each input image area.

In the example, the projection of the example input image B1_E onto the input end 114 of the light guide 110 by the input optics 120 falls on 100 fibers 112 of the light guide 110. This is shown in FIG. 1B by the incoupled image B1_L of the example input image B1_E, wherein the incoupled image B1_L now consists of a grid of (assumed here for simplicity) 10 by 10 image areas, each of which in turn corresponds to the light information transmitted in a single fiber 112. Continuing the example from FIG. 1A, each fiber 112 is assigned a brightness value between 0 and 1 for the light information transmitted therein. In addition, the respective image area is provided with a corresponding hatching.

Compared to the example input image B1_E, the coupling into the light guide 110, as shown in the example, causes a reduction or a rasterization of the original image information according to the number of fibers 112 by which the components of the example input image B1_E are transmitted in the light guide 110.

In the area of the sensor surface 132, in the example shown, the example output image B1_A emerging from the light guide 110 is detected by a raster of (assumed here for simplicity) 16 by 16 sensor pixels. The light respectively emerging from a fiber 112 of the light guide 110 typically falls in different proportions on several sensor points 134 of the image sensor 130. The respective sensor points and proportions result in particular from a position of the respective fiber 112 in the arrangement of the fibers 112 at the output-side end 116 of the light guide 110. At the same time, a mixing of light transmitted by different fibers 112 typically occurs at each of the sensor points 134. The light mixed from different fibers 112 at a respective sensor point 134 does not correlate, or correlates only in exceptional cases according to the unsorted arrangement of the fibers 112 over the path of the light guide 110, with a local relationship of the same fibers at the input-side end 114 of the light guide 110, corresponding to different areas of the example input image B1_E.

Continuing the example of FIGS. 1A and 1B, in the example output image B1_A, the area of each sensor point 134 is assigned a brightness value between 0 and 1 according to the respective detected brightness. In this case, the respective area is again provided with a corresponding hatching. By comparing with the example input image B1_E and the image B1_L coupled into the light guide 110, it can be seen from the hatchings that an image contour contained in the example input image B1_E is no longer included in the example output image B1_A when exiting the light guide 110 due to the unsorted path of the fibers 112 within the light guide 110.

Application of the method for iteratively reconstructing the example input image B1_E by the processing device 150 based on the detected example output image B1_A, as described below, results in the example reconstruction image B1_R. As can be seen in FIG. 1D, a local relationship of various brightness values included in the example input image B1_E is largely reconstructed in the example reconstruction image B1_R. In particular, an image contour included in the example input image B1_E is recognizable in the example reconstruction image B1_R.

The method described below is based on some assumptions. In this regard, it is assumed that light transported by one of the fibers 112-1-112r and emerging at the output-side end 116 of the light guide 110 typically falls on a plurality of the sensor points 134-1-134-s, wherein, moreover, different proportions of the light emerging from the respective fiber can fall on different sensor points 134-1-134-s. Moreover, it is assumed that a relative orientation of the light guide 110 and the image sensor 130 remains unchanged during a calibration process, as described below, and the detection of the input image E.

After performing the calibration process, in some examples of the device 100, the corresponding calibration data can be stored in an information carrier 140 of the device 100. This is, for example, an electronic data carrier or an identification number of the device 100, which allows access to device-specific calibration data of the device 100, wherein the calibration data are stored, for example, in a database of the manufacturer of the device 100.

For calibration, the detectable image area of the input image E is divided into a plurality of input image areas EG-1-EG-q. Then, a light source, for example a point light source in the form of a display pixel, is activated successively in each of the input image areas EG. The dimension of the light source ideally does not extend beyond the boundary of the respective input image area EG. The light from the respective input image area is projected onto a contiguous region of the input-side end 114 of the light guide 110, wherein the light is typically coupled proportionally into a plurality of adjacently arranged fibers 112-1-112r of the light guide. Due to the unsorted arrangement of the fibers 112 over the path of the light guide 110, the respective fibers emerge at different and typically non-contiguous locations of the output-side end 116 of the light guide 110. As a result, light from the light source is incident with varying proportionality on different arbitrarily positioned sensor points 134-1-134-s of the image sensor 130. Moreover, light emitted at different input image areas EG-1-EQ-q typically overlaps in a disordered manner on a given sensor point 134-1-134-s.

For each input image area EG-1-EG-q, the described manner results in a proportionality with which light from the respective input image area impinges on each individual one of the sensor points 134-1-134-s compared to light from the other input image areas.

The described method thus allows the determination of proportionality or weighting factors $w_{ij}$ for each of the sensor points 134-1-134-s with respect to each of the input image areas EG-1-EG-q. The weighting factors $w_{ij}$ thus determined represent calibration data for the device 100.

A brightness value $M_j$ measured at a single sensor point 134-j is composed according to the foregoing as a superposition of the brightness $H_i$ in each of the input image areas EG-i multiplied by its respective weighting factor $w_{ij}$ for the respective sensor point. From this results for example for the sensor point 134-j:

$$M_j = w_{1j}*H_1 + w_{2j}*H_2 + \ldots w_{qj}*H_q$$

This equation can be solved for each of the input image area brightness values $H_i$ by use of the detected brightness $M_j$ at the respective sensor point 134-j. For an initial application to calculate a first input image area brightness value $H_i$, a start value is assumed for each of the remaining input image area brightness values $H_1$-$H_q$ in the equation. This is, for example, an identical mean brightness value $\hat{H}$ of the total light impinging on the image sensor 130 for all input image area brightness values $H_1$-$H_q$. The input image area brightness value $H_i'$ calculated in this way for the input image area EG-i serves as a substitute for the start value $\hat{H}$ otherwise originally assumed also for the input image area EG-i in a subsequent analog application of the same method, for example at a different sensor point 134-1-134-s. Each input image area brightness value calculated in this way subsequently replaces a respective brightness value previously assumed or previously calculated for the corresponding input image area.

By successive application of the method, the last determined set of input image area brightness values $H_1$-$H_q$ is always used for determining any input image area brightness value $H_i$ in some examples. This allows iteratively an increasingly accurate determination of any input image area brightness value $H_i$. In particular, the method allows an improvement also in case of repeated application to already determined input image area brightness values $H_i$, as far as at least one of the brightness values of the remaining input image areas EG-1-EG-q used for this purpose has been recalculated in the meantime compared to its start value or its previous value.

In order to increase the efficiency of the method, in some examples it is provided to limit the set of weighting factors $w_{ij}$ associated with a sensor point 134-j with respect to different input image areas EG-1-EG-q to those weighting factors whose associated input image areas contribute with at least a threshold proportionality to a detected brightness at the sensor point 134-j. In this way, unnecessary computational effort can be avoided, which would otherwise arise if also such input image areas EG-1 EG-q are taken into account in the computation, whose brightness does not contribute or contributes only slightly to a detected brightness at the sensor point 134-j because of the position of their corresponding fibers 112-1-112-r. The remaining weighting factors $w_{ij}$ are subsequently normalized in this process, for example. Excluding input image area brightness values EG-1-EG-q that do not or only slightly contribute to the brightness at a particular sensor point from the calculation allows, in typical applications, a reduction of the computational effort by more than one order of magnitude.

In order to stabilize the method, in some examples, an attenuation is provided in the calculation of the input image area brightness values. In this regard, the attenuation comprises, for example, an averaging of a brightness value for an input image area currently determined based on the weighting factors with respective previously calculated brightness values for the same input image area. In some examples, local smoothing is also or instead performed in the calculation of an input image area brightness value based on one or more input image area brightness values assigned to adjacent areas of the respective area in the input image. Here, both attenuation and smoothing can be performed by weighted averaging. The attenuation weighting and the averaging weighting can respectively be constant or vary during successive executions of the method for an input image area, corresponding to successive iterations.

According to the above equation, the brightness value $M_j$ measured at a respective sensor point 134-j is usually composed as a weighted superposition of the brightnesses in several input image areas. Similarly, a brightness in a particular input image area usually contributes to a measured brightness value at a plurality of sensor points. According to the above equation, a brightness of the same input image area can thus be determined starting from each of the respective sensor points. In some examples, in order to calculate the input image area brightness value, it is provided to determine a brightness of the input image area starting from different sensor points, respectively, according to the procedure described above, and further to calculate the input image area brightness value by subsequently averaging the brightnesses determined in this way. In some examples, the averaging is performed as a weighted averaging. For example, the weighted averaging is performed at least in part based on the weighting factors assigned to the input image area with respect to the various sensor points.

In some examples, moreover, replacing input image area brightness values with the respective calculated input image area brightness values occurs only after an input image area brightness value has been calculated for each area of the input image E in one of the ways described, according to an iteration cycle of the method that includes the entire input image E. A sequential application of the method comprises, for example, a repeated execution of the method for all areas of the input image. In this case, each iteration cycle of the method corresponds to a recalculation of the entire input image E, respectively starting from a previous reconstructed version of the input image E.

Figure 2:
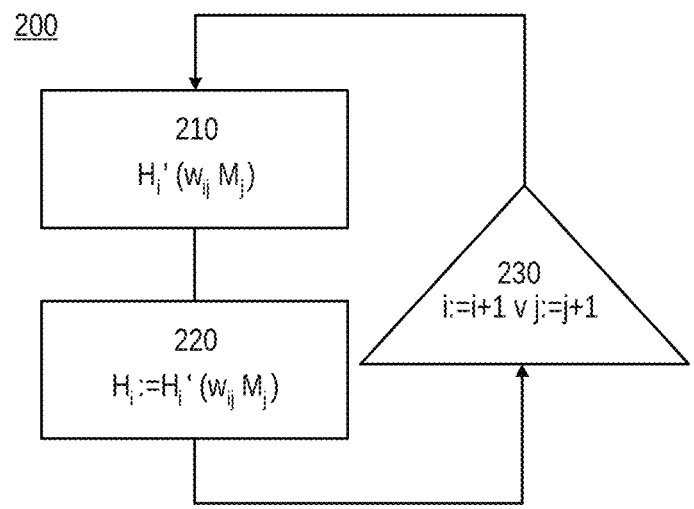
FIG. 2 shows a flowchart for a method for iteratively reconstructing an input image according to an example.

FIG. 2 schematically shows a flowchart of a method 200 for iteratively reconstructing an input image from an output image, as described above in connection with FIGS. 1A to 1D. The method 200 comprises calculating an input image area brightness value $H_i'$ based on a sensor point brightness value $M_j$ of the output image A detected at the j-th sensor point 134-j of the image sensor 130 and a weighting factor $w_{ij}$ associated with the i-th area EG-i of the input image E with respect to the j-th sensor point 134-j, step 210. The calculation is further performed by use of at least one further input image area brightness value associated with a further area of the input image E and weighted by a further weighting factor associated with the further area of the input image E with respect to the j-th sensor point 134-j, as described above.

The method 200 further comprises replacing an i-th input image area brightness value $H_i$ associated with the i-th area EG-i of the input image E with the calculated input image area brightness value $H_i'$ for use as a henceforth i-th input image area brightness value $H_i$, as described above, step 220.

The method 200 then comprises sequentially applying the aforementioned method steps of calculating, step 210, and replacing, step 220, to any sensor point brightness value $M_1$-$M_s$ associated with any sensor point 134-1-134-s of the image sensor 130, and for any weighting factor $w_{11}$-$w_{qs}$ associated with any area EG-1-EG-q of the input image E with respect to the respective sensor point 134-1-134-s of the image sensor 130, as described above, step 230.

The sequential application, step 230, can be implemented differently in different examples of the method 200. For example, a sequence of applying for different input image areas EG is determined at least in part by an ascending numbering of the input image areas EG, wherein the numbering is determined by an arrangement of the input image areas EG in the input image E. Additionally or alternatively, in some examples, an order of application for different weighting factors w associated with a particular sensor point 134 is also determined at least in part by an ascending numbering of the input image areas EG, wherein the numbering is determined by an arrangement of the input image areas EG in the input image E. In other examples, an order in the sequential application is determined in a different way.

Furthermore, in some examples, it is provided to perform the method 200 multiple times for at least one group of input image area brightness values. Repeated execution of the method has the effect that respectively more precise input image area brightness values from previous calculations are available for the renewed calculation of a further input image area brightness value and are used, which in turn permits a more precise calculation of the further input image area brightness value.

Figure 3:
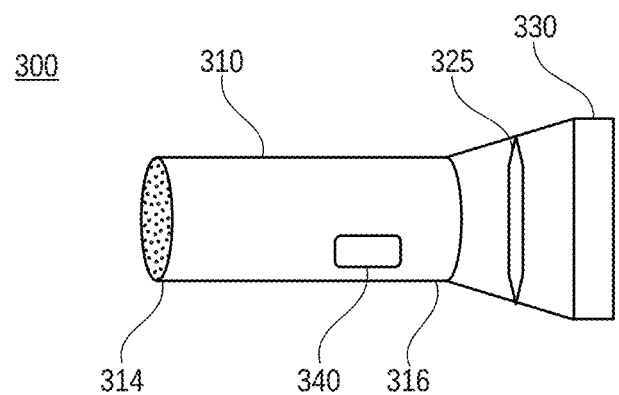
FIG. 3 shows a device for iteratively reconstructing an input image according to another example.

FIG. 3 schematically and exemplarily illustrates a further device 300. The device 300 comprises a light guide 310 comprising an input-side end 314 and an output-side end 316. The device 300 further comprises an image sensor 330 disposed at the output side with respect to the light guide 310, and an output optical system 325. With respect to these features of the device 300, the statements mentioned above with respect to the device 100 apply mutatis mutandis. The device 300 further comprises an information carrier 340. The information carrier 340 includes data indicative, for each of a plurality of sensor points of the image sensor 330, of a proportionality with which a brightness in any one of different areas of an input image that is couplable to the light guide 310 at the input-side contributes to a detected brightness of a corresponding output image in the region of the respective sensor point.

In some examples, the information carrier 340 explicitly includes said information. In this regard, the information carrier 340 is formed, for example, as an electronic storage medium, for example, a memory chip, RFID chip, ROM, or EPROM, which can be read out by a user of the device 300 and used to perform the method of the type presented herein. In other examples, the information carrier 340 comprises a bar code or QR code. In some examples, the information carrier 340 includes access data for accessing a database in which said information is stored and, in turn, can be read out by a user of the device 300.

Figure 4:
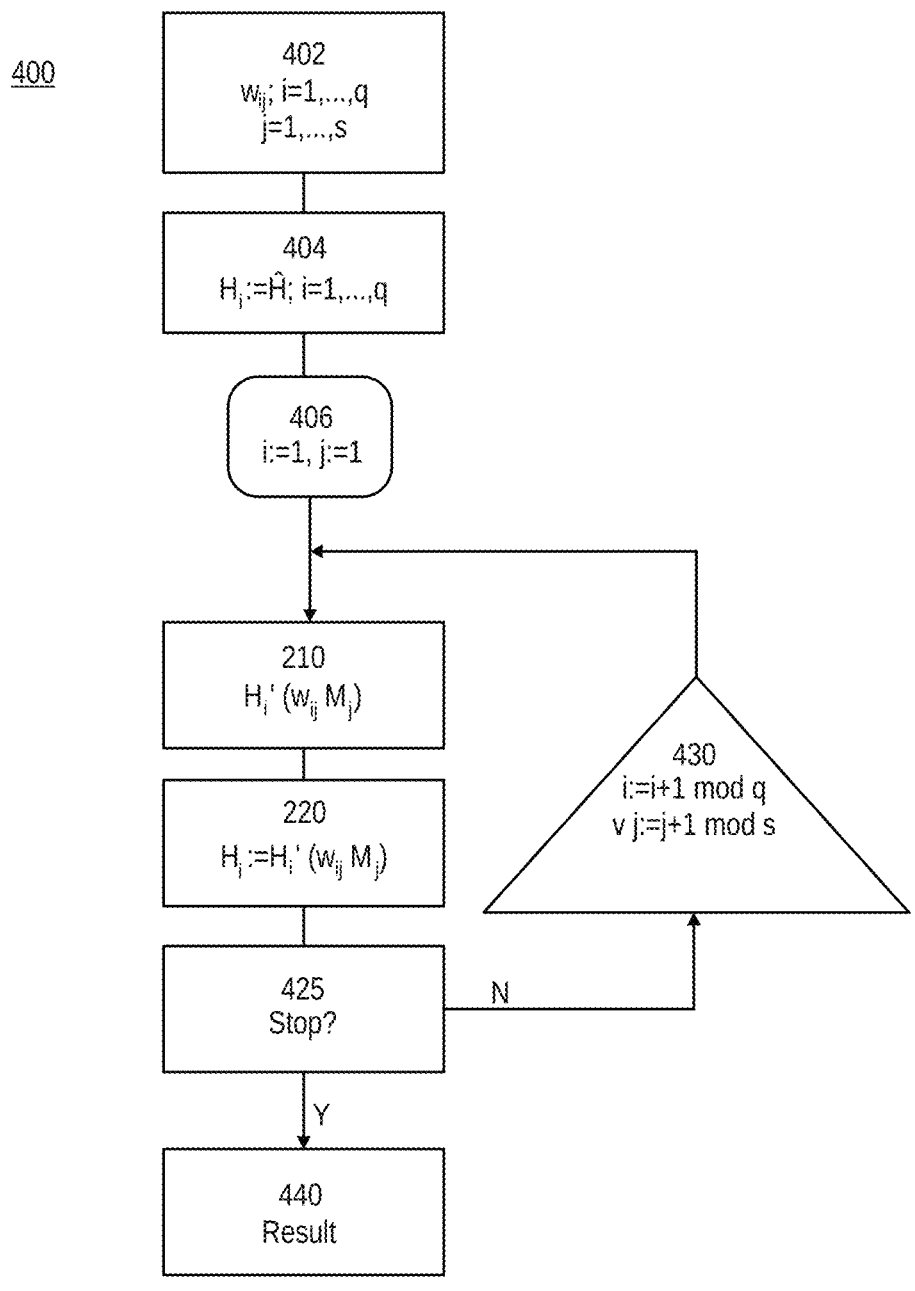
FIG. 4 shows a flowchart for a method for iteratively reconstructing an input image according to another example.

FIG. 4 shows a flowchart for another method 400. The method 400 also includes the steps of calculating an input image area brightness value, step 210, and then replacing an input image area brightness value with the calculated input image area brightness value, step 220, as a part of a repeatedly performed method section. With respect to steps 210 and 220 of the method 400, the above described with respect to steps 210 and 220 of the method 200 applies accordingly.

The method 400 further comprises a determination of the weighting factors $w_i$, step 402, preceding step 210. The determination of the weighting factors $w_{ij}$ is performed, for example, by a calibration method as described above with reference to FIGS. 1A to 1D.

The method 400 further comprises determining a start value $\hat{H}_i$ for each input image area brightness value $H_i$, step 404, preceding step 210. Here, the start value $\hat{H}$ is selected to be the same for each of the input image area brightness values $H_i$, for example. For example, the start value for each input image area brightness value corresponds to a mean brightness value of the detected input image E. In further examples, different start values $\hat{H}$ are selected for different input image area brightness values $H_i$, for example based on an expected brightness distribution in the input image E, for example based on at least one previously detected and/or iteratively reconstructed input image E.

The method 400 further comprises determining an initial sensor point 134-j and an initial input image area i, with respect to which the subsequent computing, step 210, is applied first, step 406.

The method 400 comprises, subsequent to calculating and replacing, steps 210, 220, checking whether a termination criterion for repeatedly applying the steps 210, 220 is satisfied, step 425. The termination criterion comprises, for example, falling below a threshold difference between the results of two iteratively performed calculations of a brightness value for the same input image area EG. In further examples, the termination criterion comprises a threshold number of iterative executions of steps 210 and 220 for any input image area EG and/or with respect to any weighting factor associated with any of the input image areas EG with respect to any sensor point. In the case where the termination criterion is not satisfied, sequential application of steps 210 and 220 is continued, N-branch in FIG. 4. If the termination criterion is satisfied, the sequential application of steps 210 and 220 is stopped, Y-branch in FIG. 4.

Similar to the method 200, the method 400 also comprises sequentially applying the steps 210 and 220 to different input image area brightness values EG-i and/or to different sensor points 134-j, step 430. In some examples, the sequential application, step 430, is selected with respect to the selected termination criterion, step 425. This includes, for example, a sequence and/or a frequency with which indices i and j, corresponding to different input image area brightness values $H_i$ and sensor point brightness values $M_j$, respectively, are varied.

In the case in which it is determined in step 425 that the termination criterion is satisfied, the result of input image area brightness values $H_i$ determined up to that point is deemed to be the reconstructed input image E, step 440. This comprises, for example, storing and/or outputting the generated array of input image area brightness values $H_i$ in the form of an image file.

Figure 5:
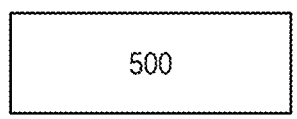
FIG. 5 shows a flowchart for a use.

FIG. 5 shows schematically and exemplarily a flowchart of a use 500. The use 500 comprises using a method, a computer program product and/or a device of the type presented herein respectively for reconstructing a plurality of input images E in real time. In this regard, the input images E are coupled into the light guide in conjunction with a real-time image acquisition.

In some examples, the use is for the purpose of monitoring a movement and/or a number of moving objects represented by the plurality of input images E.

Similar to the example in FIGS. 1A to 1D, FIGS. 6A and 6B show another example of a sequence of an example input image B2_E and a corresponding example incoupling B2_L into a bundle of (assumed here for simplicity) 10 by 10 fibers of a light guide, a corresponding example output image B2_A, and a corresponding example reconstruction image B2_R. Here, the representation in FIG. 6B corresponds to an extension of the representation of FIG. 6A at the upper edge of the image, as indicated by the outgoing arrow at the lower edge of FIG. 6A and the incoming arrow at the upper edge of FIG. 6B.

Figure 6A:
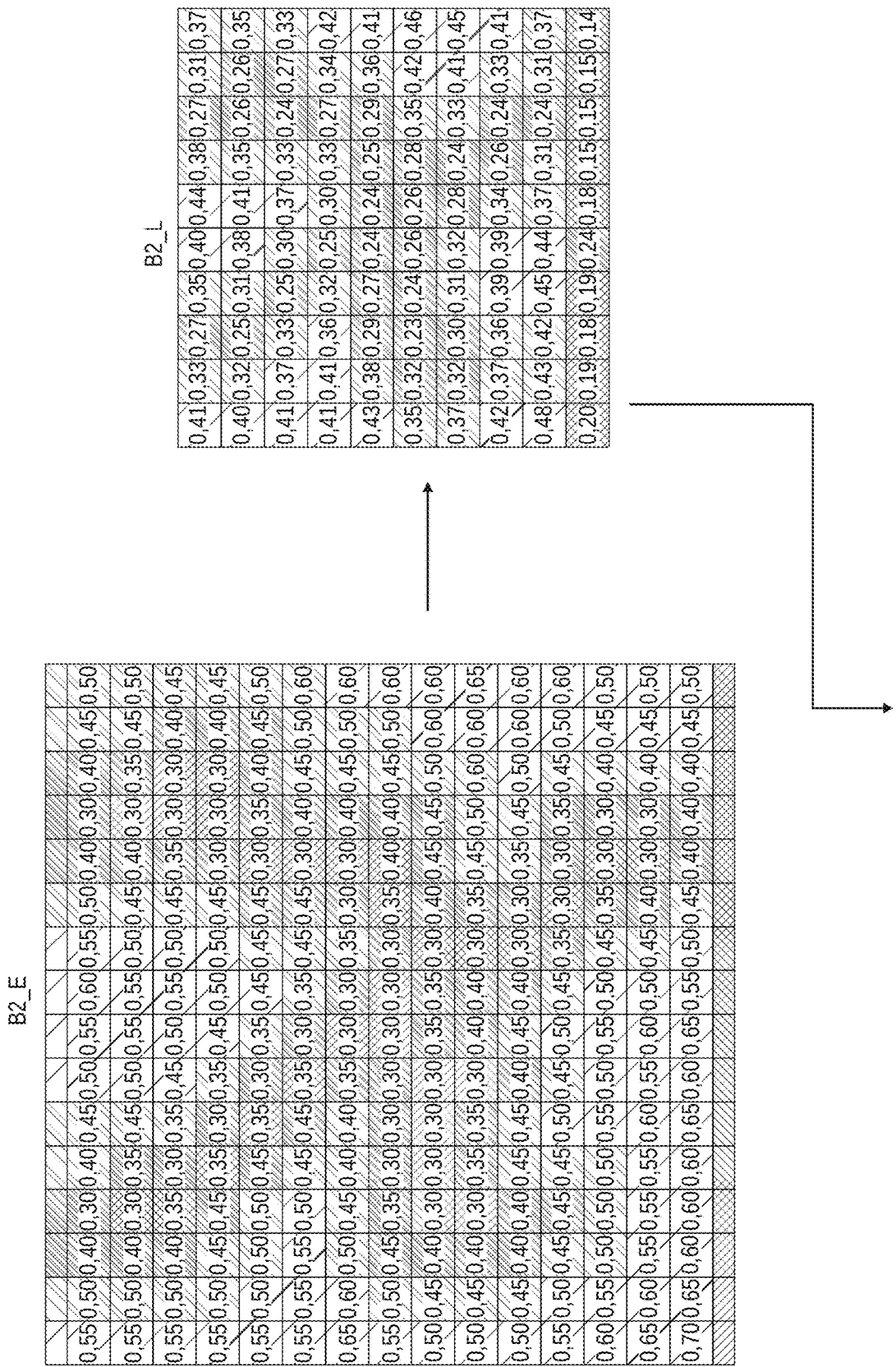
Figure 6B:
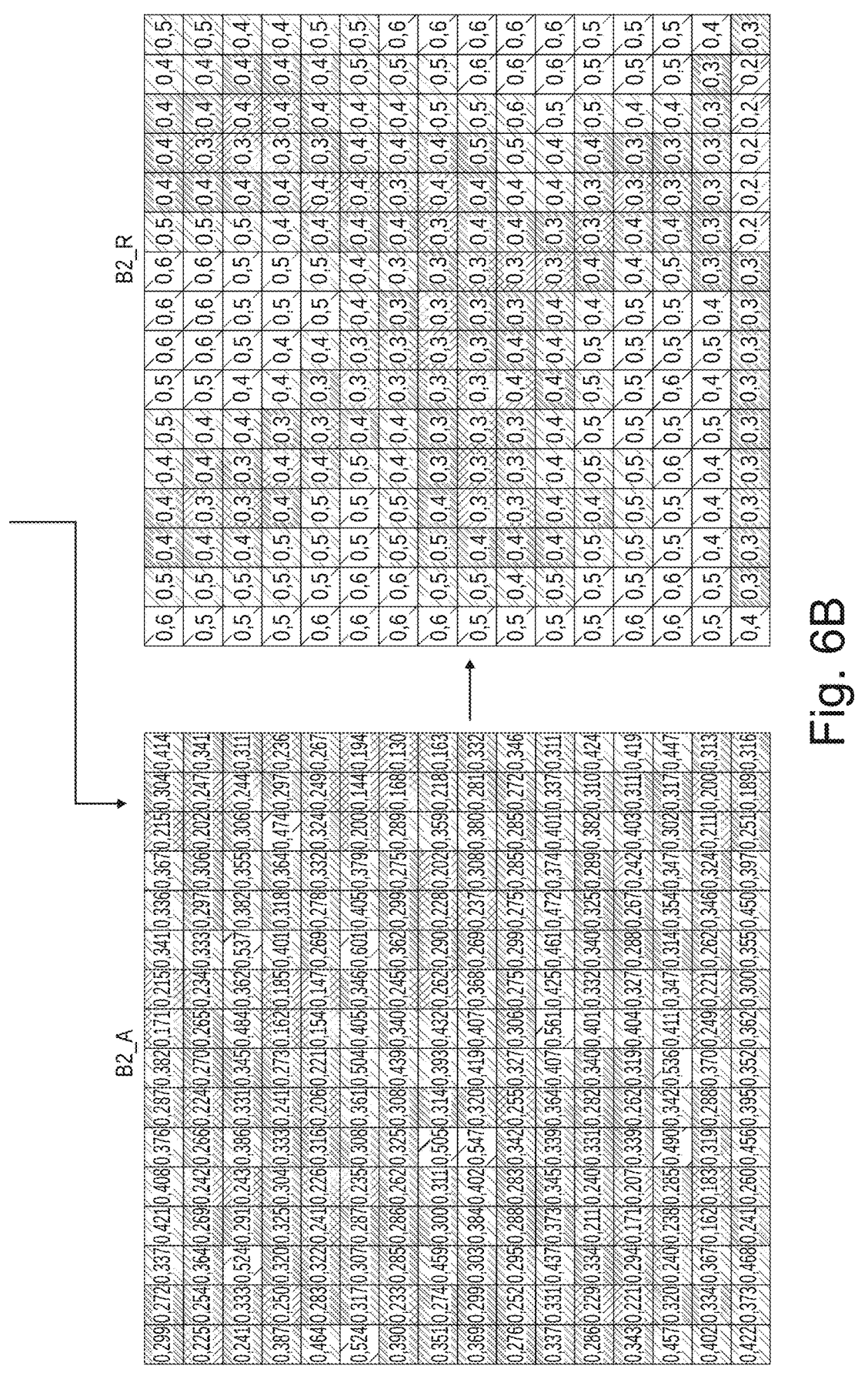

The motif for the example in FIGS. 6A and 6B is essentially the same as the motif in FIGS. 1A to 1D. In contrast to FIG. 1A, however, the example input image B2_E in FIG. 6A is shifted upward by half a pixel height relative to the raster. The image protrusion of half a pixel in the upper area was cut off and the empty space in the lower image area was filled in black.

Application of the described method to the example input image B2_E shows the stability of the presented method by the example reconstruction image B2_R. At the same time, as expected, a partial blurring of the sharp contrast edge in the lower image area of the example input image B2_E is visible both as a result of the coupling B2_L into the fiber bundle and during the subsequent not quite complete decomposition B2_R of the output image B2_A by the method.

The examples described above with reference to FIGS. 1A to 6B refer in general to the detection and calculation of brightness or a brightness distribution in an output image and an input image. This corresponds, for example, to an application of the method in connection with black-and-white images or grayscale image information. However, the described method is also applicable to color images or multi-color image information. In this case, the image sensor 130 has, for example, different color channels, and the described method is performed for each of the color channels, for example separately according to color channels. A reconstruction of the input image in these cases further comprises, for example, a subsequent merging of the results of the executions of the method for each of the color channels.

The described features make the presented method particularly advantageous for black-and-white applications that do not require a very high level of detail, e.g. less sharp details, high contrast, or high resolution of the determined, reconstructed image. This includes, for example, monitoring applications with respect to larger movements in a monitored environment or with respect to a number of detected objects. In such applications, the technology presented can be used to dispense with expensive optical systems, in particular image guides that are costly to produce. It is also understood that, in particular depending on respectively available computing resources and image acquisition means, further advantageous applications of the technology presented here are conceivable.

The invention claimed is:

1. A method for iteratively reconstructing an input image from an acquired output image, wherein the output image is generated by transmitting components of the input image by a light guide comprising unsorted fibers, the output image is detected by an image sensor comprising a plurality of sensor points, the method comprising the steps of:
    calculating an input image area brightness value for a first area of the input image based on:
    at least a first sensor point brightness value associated with a first sensor point of the image sensor and indicative of a sensed brightness of the output image in proximity of the first sensor point;
    a first weighting factor associated with the first area of the input image with respect to the first sensor point; and
    at least one further input image area brightness value that is associated with a further area of the input image and which is weighted by a further weighting factor associated with the further area of the input image with respect to the first sensor point; and
    replacing a first input image area brightness value associated with the first area of the input image with the calculated input image area brightness value for subsequent use as the first input image area brightness value,
    wherein the calculating and replacing are sequentially performed.

2. The method according to claim 1, wherein:
    the first sensor point brightness value is a plurality of sensor point brightness values and each is associated with a different sensor point of the plurality of sensor points of the image sensor;

wherein the first area of the input image is a plurality of areas of the input image;

wherein the first weighting factor is a plurality of weighting factors, each of which is assigned to any one area of the input image with respect to a same sensor point of the image sensor; and/or the calculating and replacing are sequentially repeatedly performed.

3. The method according to claim 1, wherein:

the calculating and replacing is performed for each of a plurality of sensor point brightness values associated with any sensor point of the plurality of sensor points; and/or the calculating and replacing is performed to all weighting factors of a plurality of weighting factors respectively associated with any area of the input image with respect to a same sensor point of the image sensor.

4. The method according to claim 1, wherein the calculating is based on a plurality of sensor point brightness values that are associated with different sensor points of the image sensor and each is indicative of a detected brightness of the output image in the area of a respective sensor point of the different sensor points.

5. The method according to claim 4, wherein the calculating is performed for each sensor point brightness value of the plurality of sensor point brightness values based on a respective first weighting factor associated with the first area of the input image with respect to the respective sensor point and at least one respective further input image area brightness value associated with a respective further area of the input image and weighted by a respective further weighting factor associated with the respective further area of the input image with respect to the respective sensor point.

6. The method according to claim 5, wherein the calculating is performed for each sensor point brightness value of the plurality of sensor point brightness values, to determine a sensor point specific brightness value for the first area of the input image, and wherein the calculating is performed based on the plurality of sensor point specific brightness values for the first area of the input image.

7. The method according to claim 6, wherein the calculating comprises averaging the plurality of sensor point specific brightness values for the first area, and wherein the averaging is performed according to a weighting of the plurality of sensor point specific brightness values for the first area based on the weighting factors associated with the first area with respect to the respective sensor points.

8. The method according to claim 4, wherein the calculating is performed for each of a plurality of areas of the input image and for each of one or more weighting factors that are each associated with any one area of the input image with respect to a same sensor point of the image sensor, and wherein the replacing is performed for the input image area brightness values associated with the plurality of areas of the input image with the calculated input image area brightness values.

9. The method according to claim 1, further comprising: repeatedly performing the calculating and replacing until a predetermined termination criterion occurs.

10. The method according to claim 1, further comprising, prior to the calculating:

determining, for each of the plurality of sensor points, a set of weighting factors each of which is associated with a different area of the input image with respect to the respective sensor point, wherein the determining is based on a proportionality with which a brightness in the area of the input image associated with a respective weighting factor with respect to the respective sensor point contributes to a sensed brightness of the output image in the area of the respective sensor point, and wherein the proportionality is at least partially due to a fiber arrangement of the light guide.

11. The method according to claim 10, wherein the determining further comprises:

determining, for each of a plurality of areas of the input image, a proportionality with which a brightness in a respective area of the input image contributes to a sensed brightness of the output image in the area of the respective sensor point;

discarding areas of the input image in which the proportionality is less than a threshold proportionality;

determining a weighting factor for each of remaining area based at least in part on a proportionality associated with the area of the respective sensor point; and normalizing the weighting factors.

12. The method according to claim 1, wherein the calculating is performed, at least in part, according to a mathematical function by which the first sensor point brightness value is related to a sum of input image area brightness values weighted by respective weighting factors.

13. The method according to claim 1, further comprising, prior to the calculating, assigning a brightness start value to each area of the input image as the input image area brightness value of a respective area.

14. The method according to claim 1, wherein the calculating further comprises an attenuation based on one or more previously calculated input image area brightness values of the first area of the input image and/or locally smoothing based on one or more input image area brightness values associated with adjacent areas of the first area in the input image.

15. The method according to claim 1, wherein the plurality of sensor points are disposed on a sensor surface of the image sensor, and wherein the plurality of sensor points is determined by a total number of sensor points of the image sensor or by a subset of sensor points of the image sensor by which the output image is detected.

16. The method according to claim 1, wherein the image sensor comprises a plurality of color channels and the calculating and replacing are performed for each color channel of the plurality of color channels, and wherein the method further comprises, prior to the calculating, determining, for each of the plurality of sensor points, a set of weighting factors that are each associated with a different area of the input image with respect to a respective sensor point, wherein the determining is performed uniformly for the plurality of color channels or separately for each of the color channels of the plurality of color channels.

17. The method according to claim 1, wherein the light guide and the image sensor are arranged such that a number of the fibers in the light guide and a number of sensor points of the image sensor differ from each other by not more than twenty times.

18. The method according to claim 1, wherein the input image corresponds to an optical projection of at least one area of an environment which is at least partially coupled into the light guide.

19. The method according to claim 1, further comprising at least one of:

storing the input image area brightness values in a data format suitable for at least one of storing a reconstruction of the input image and displaying the reconstruction of the input image; and outputting the input image area brightness values in the data format.

20. The method according to claim 1, wherein the method is performed in real time, wherein the input images are coupled to the light guide during real-time image acquisition, and wherein the method further comprises: monitoring at least one of a motion and a number of moving objects represented by the plurality of input images.

21. A computer program product, comprising program code stored in a non-transitory storage medium that, when executed on a processor of a computer device, cause the computer device to execute the method of claim 1.

22. A device, comprising:
   at least one light guide that has partially unsorted fibers;
   at least one image sensor that has a plurality of sensor points and is configured to detect an output image generated by transferring components of an input image by the light guide; and
   a processing device comprising a processor unit and a memory device operatively connected to the processor unit, wherein the processor unit is configured to sequentially:
      (a) calculate an input image area brightness value for a first area of the input image based on: at least a first sensor point brightness value associated with a first sensor point of the image sensor and indicative of a sensed brightness of the output image in the area of the first sensor point, a first weighting factor associated with the first area of the input image with respect to the first sensor point, and at least one further input image area brightness value which is associated with a further area of the input image and which is weighted by a further weighting factor associated with the further area of the input image with respect to the first sensor point; and
      (b) replace a first input image area brightness value associated with the first area of the input image with the calculated input image area brightness value for subsequent use as the first input image area brightness value.

23. The device according to claim 22, further comprising:
   at least one information carrier containing data indicative, for each of the plurality of sensor points, of a proportionality with which a brightness in any of different areas of the input image contributes to a detected brightness of the output image in the area of the respective sensor point.

24. The device according to claim 22, wherein the light guide and the image sensor are arranged so that a number of the fibers in the light guide and a number of the sensor points of the image sensor, by which the output image is detected, are different from each other by not more than twenty times the respective smaller of the two numbers.

* * * * *